United States Patent
Hamann et al.

(10) Patent No.: US 9,631,516 B2
(45) Date of Patent: Apr. 25, 2017

(54) DRIVE OF A TAIL ROTOR OF A HELICOPTER

(75) Inventors: Jens Hamann, Fürth (DE);
Hans-Georg Köpken, Erlangen (DE);
Dietmar Stoiber, Fürth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 644 days.

(21) Appl. No.: 13/811,875

(22) PCT Filed: Jul. 15, 2011

(86) PCT No.: PCT/EP2011/062114
§ 371 (c)(1),
(2), (4) Date: Jan. 23, 2013

(87) PCT Pub. No.: WO2012/019864
PCT Pub. Date: Feb. 16, 2012

(65) Prior Publication Data
US 2013/0121831 A1    May 16, 2013

(30) Foreign Application Priority Data

Jul. 27, 2010 (EP) .................................. 10170932

(51) Int. Cl.
*B64C 27/82* (2006.01)
*F01D 25/16* (2006.01)
*H02K 7/09* (2006.01)
*H02K 21/24* (2006.01)
*H02K 7/14* (2006.01)

(52) U.S. Cl.
CPC .............. *F01D 25/16* (2013.01); *B64C 27/82* (2013.01); *H02K 7/09* (2013.01); *H02K 21/24* (2013.01); *B64C 2027/8209* (2013.01); *H02K 7/14* (2013.01)

(58) Field of Classification Search
None
See application file for complete search history.

(56) References Cited

U.S. PATENT DOCUMENTS

| 6,979,925 | B2 | 12/2005 | Schwamm |
| 7,448,854 | B2* | 11/2008 | Jolly et al. ........................ 416/1 |
| 7,535,145 | B2* | 5/2009 | Murakami ........... H02K 1/2793 310/156.08 |
| 7,888,839 | B2* | 2/2011 | Gabrys .................... H02K 3/47 310/112 |

(Continued)

FOREIGN PATENT DOCUMENTS

| CN | 101423117 A | 5/2009 |
| CN | 201367116 Y | 12/2009 |

(Continued)

*Primary Examiner* — Igor Kershteyn
*Assistant Examiner* — Justin Seabe
(74) *Attorney, Agent, or Firm* — Henry M. Feiereisen LLC

(57) ABSTRACT

The invention relates to a drive (1) of a tail rotor (12) of a helicopter (10) by a permanently excited transversal flux machine in duplex arrangement in such a way that between two stators (4), which each have a toroidal winding system (8), there is arranged a disc-shaped impeller (5), which has permanent magnets (15) and on the outer circumference of which propeller blades (14) of the tail rotor (12) are arranged.

4 Claims, 2 Drawing Sheets

(56) References Cited

U.S. PATENT DOCUMENTS

| | | | |
|---|---|---|---|
| 2006/0060693 A1 | 3/2006 | Poltorak | |
| 2008/0136282 A1* | 6/2008 | Okazaki | H02K 21/24 310/156.36 |
| 2010/0123039 A1* | 5/2010 | Buhl | B64C 27/82 244/17.19 |

FOREIGN PATENT DOCUMENTS

| | | |
|---|---|---|
| DE | 39 15 526 A1 | 8/1990 |
| DE | 196 56 647 A1 | 6/2000 |
| DE | 102 42 833 A1 | 4/2004 |
| RU | 22 66 236 C2 | 12/2005 |
| WO | WO 2008/032430 A1 | 3/2008 |
| WO | WO 2009/115247 A1 | 9/2009 |
| WO | WO 2009/143669 A1 | 12/2009 |
| WO | WO 2010/048928 A2 | 5/2010 |

* cited by examiner

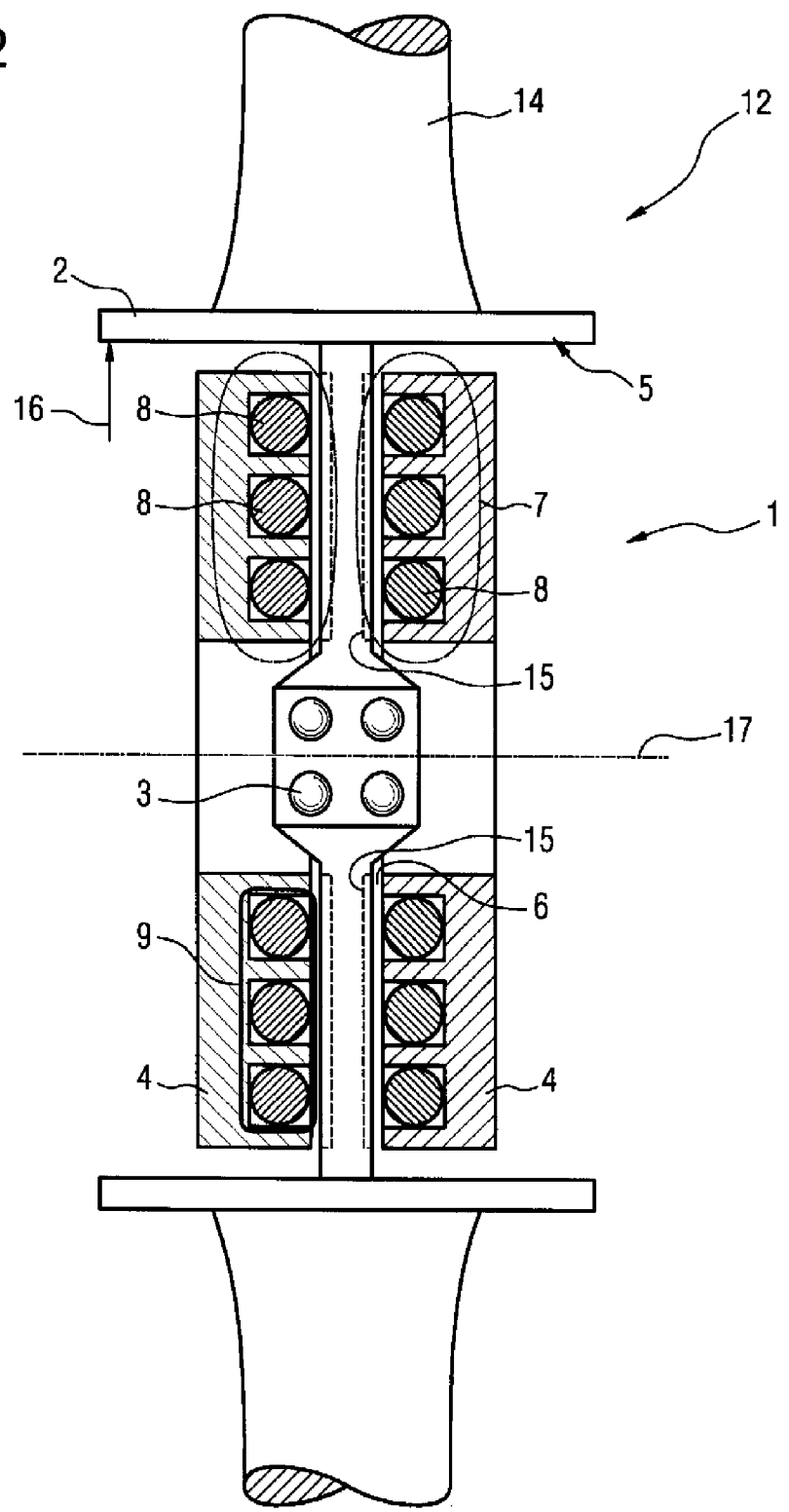

DRIVE OF A TAIL ROTOR OF A HELICOPTER

CROSS-REFERENCES TO RELATED APPLICATIONS

This application is the U.S. National Stage of International Application No. PCT/EP2011/062114, filed Jul. 15, 2011, which designated the United States and has been published as International Publication No. WO 2012/019864 and which claims the priority of European Patent Application, Serial No. 10170932.7, filed Jul. 27, 2010, pursuant to 35 U.S.C. 119(a)-(d).

BACKGROUND OF THE INVENTION

The invention relates to a drive for a tail rotor on a helicopter which uses a dynamoelectric machine.

A helicopter normally has two rotors, wherein a main rotor is driven by a vertically oriented shaft and a tail rotor by an axially oriented shaft. Here, the term rotor is to be understood as the rotor blades together with the rotor head to which these rotor blades are attached. For helicopters, the aim is to achieve a comparatively high specific power, that is kilowatts/kilogram, in order to increase the load bearing capacity of the helicopter.

A helicopter is an aircraft which starts and lands vertically, and which uses one or more motor-powered rotors for lift and forward motion, these working as rotating lift surfaces or wings or rotor blades, for which reason helicopters are classified as rotary wing aircraft.

With the single rotor systems most commonly used a torque arises at the rotor axis of the main rotor, which causes the body of the helicopter to rotate in the opposite sense. In order to prevent this, one of the possibilities is to provide a sideways counterthrust from a tail rotor.

The tail rotor configuration is a widely used method of construction in helicopters for compensating for the torque produced by the main rotor. With this, a tail rotor, which is attached to a tail boom on the helicopter outside the sweep of the main rotor, creates a horizontal thrust to counteract the rotation of the body about the vertical axis. Apart from torque compensation, the tail rotor also serves to steer the helicopter about its main axis, that is to turn to the right/left. The thrust from the tail rotor is generally controlled by a linkage, which changes the common angular setting of the rotor blades. The tail rotor takes up about 20% of the total drive power of a helicopter.

A disadvantage of drives previously used for a tail rotor is that a comparatively high proportion of the drive power and the total weight of the helicopter is due to the tail rotor.

In order to compensate for the torque, a helicopter with double rotors is known from WO 09/143669 A1, the rotors on this being driven by electric motors.

DE 39 15 526 A1 discloses a duplex electric motor by which a hollow rotor is set in rotation from outside and from inside, so that a comparatively high power can be achieved relative to conventional electric motors.

DE 198 56 647 A1 discloses a high-torque electric motor which is constructed as a multi-pole permanent-magnet-excited electric machine and has a hollow cylindrical rotor made of mild steel, which has permanent magnets positioned on both sides, is arranged coaxially between an outer and an inner stator and has a rotatable linkage to a shaft mounted in a bearing in the machine housing.

SUMMARY OF THE INVENTION

Starting from this, the object underlying the invention is further to reduce the power-to-weight ratio of a helicopter, combined with a simple tail rotor construction.

The stated object is achieved by a drive for a helicopter tail rotor which uses a permanently excited transverse flux machine in a duplex configuration, of such a nature that there is, arranged between two stators each of which has a ring winding system, a disk-shaped rotor which has permanent magnets and on the outer perimeter of which are arranged propeller blades of the tail rotor.

In accordance with the invention, a transverse flux motor with a duplex arrangement, which has ring windings, is provided for the tail rotor drive. In order to increase the utilization of the transverse flux motor, in accordance with the invention this motor is arranged in a duplex configuration, i.e. stators with ring windings are provided both on the one side and on the other side of the disk-shaped rotor. Here, two stators are arranged in such a way that their slots and teeth are opposed to each other and arranged between them is a disk-shaped rotor on which there are permanent magnets.

Each stator has a ring winding system, the windings of which are arranged concentrically about an axis of the tail rotor. The ring windings of the entire tail rotor drive are preferably constructed as two three-phase a.c. winding systems, wherein each stator has a three-phase a.c. ring winding system. The two ring winding systems are then called on for the purpose of regulating the axial position of the rotor, and with it the entire tail rotor. In doing so, the basic method of symmetric components is used to undertake a simplified analysis of an asymmetry in a three-phase a.c. system or in a higher order system.

In doing so, an asymmetric system is subdivided into a positive phase-sequence system, a negative phase-sequence system and a zero phase-sequence system.

Preferably, the zero-phase-sequence systems of the two ring winding systems will be regulated independently of one another. The axial force necessary for the bearing can thus be applied electrically.

For the purpose of producing and controlling the axial bearing force, it is again possible to provide not only the zero phase-sequence system but also other combinations of the phase currents in the ring winding systems. The zero phase-sequence system is a combination of phase currents which does not affect the torque of the drive. This is particularly advantageous because the torque production and the axial load-bearing capacity are thereby decoupled.

A further favorable combination of phase currents is achieved by field-oriented regulation, by which an enhanced rotation speed and positioning accuracy is achieved for a drive by the use of a frequency converter. In the case of the axial magnetic bearing mounting, because of the d/q (direct/quadrature) transformation it is only the one three-phase a.c. phasor in the d direction which is important. As is generally known, for a synchronous motor the q direction of the three-phase a.c. produces the torque. The d direction does not influence the torque. Hence it is possible in accordance with the invention to design the transverse flux motor in such a way that the d direction controls the attractive force, between the rotor and the stator concerned, in a unique and constant manner. For this vector regulation, the position of the field spider, that is the rotor, is important. This can be determined without sensors, or using an encoder.

Hence, for the purpose of designing an axial magnetic bearing, the d direction of the three-phase a.c. system is also basically suitable, in addition to the zero phase-sequence system of the three-phase a.c. system.

If the zero phase-sequence system of the three-phase a.c. is now used for the production and control of the axial load-bearing force, then the rotor of the drive should also have ferromagnetic properties, that is in particular be mild steel. The zero phase-sequence system field lines on the disk of the rotor then establish a force density which can be utilized. Hence the permanent magnets should be attached onto a thin ferromagnetic plate, in the form of a washer. In order to reduce the eddy current losses in the disk-shaped rotor, the washer will be constructed with fan-like, or spoked or concentric slotting.

The size of a motor is determined by the torque. In order now to maintain a high torque output, a multi-pole motor will be provided in which the poles of the rotor lie around a comparatively large diameter.

In order to further raise the utilization of the drive, the ring windings of the stator will be oil-cooled. Here, it is particularly advantageous if the ring winding system of a stator is surrounded by a can, that is a closed oil sump in which the oil circulates, which dissipates the heat losses from the winding and thus contributes to the cooling of the winding system concerned.

In a further embodiment, the can surrounds not only the ring winding system, but the entire stator, so that the losses from the iron core of the stator can also be dissipated.

The rotor is constructed in a disk shape and on its sides which face the stator is provided with high-temperature resistant permanent magnets.

In order to further reduce the eddy currents within the permanent magnets, the permanent magnets are of laminated construction. Here, the structure of the lamination is such that the potential paths for eddy currents within the permanent magnets are effectively broken up.

The rotor is cooled by means of a through-flow of air in the air gap between the rotor and the stators.

Apart from materials with ferromagnetic properties, the carrier material of the rotor, which is constructed in the shape of a disk, is at least in part also high strength carbon/Kevlar with embedded high-temperature resistant permanent magnets. Arranged on the outer perimeter of the disk-shaped rotor are the rotor blades of the tail rotor, preferably as radial extensions of the disk.

BRIEF DESCRIPTION OF THE DRAWING

The invention together with advantageous embodiments of the invention are to be deduced from the attached drawing; this shows:

FIG. 2 a tail rotor drive in the helicopter.

DETAILED DESCRIPTION OF PREFERRED EMBODIMENTS

Figure 1:
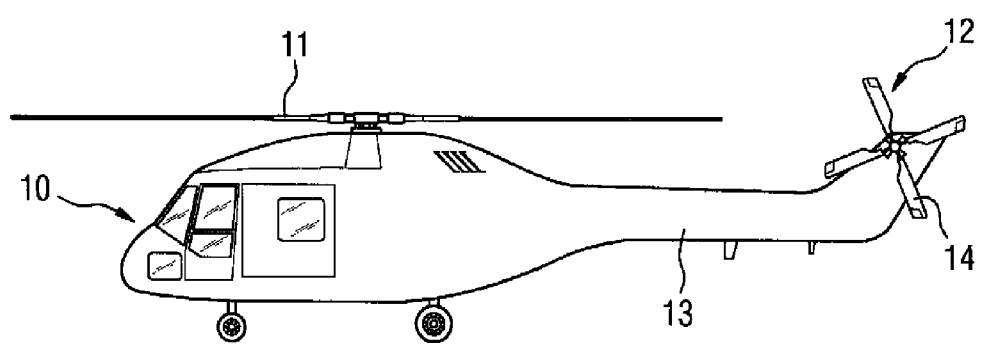
FIG. 1 a helicopter.

FIG. 1 shows a diagram of the principle of a helicopter 10 with a main rotor 11 and a tail rotor 12, shown by way of example, which is arranged on a tail boom 13. Here, the tail rotor, which is attached in the tail boom 13 of the helicopter 10 outside the sweep of the main rotor 11, produces a horizontal thrust to counteract the turning of the body about the main axis. Apart from torque compensation, the tail rotor 12 is also used to steer the helicopter 10 about its main axis, that is for right/left turns.

FIG. 2 shows a drive 1 in accordance with the invention, for a tail rotor 12 on a helicopter 10, which uses a permanently excited transverse flux machine in a duplex arrangement. Here, both on the left and on the right of a rotor 5 there is a stator 4 with ring windings 8 which are arranged concentrically about an axis 17. The rotor 5 is mounted on this axis 17 by means of radial bearings 3 in such a way that it can rotate. On the radially outer edge of the disk-shaped rotor 5, a supporting structure 2 is provided, on which are arranged the propeller blades 14 of the tail rotor 12. In this form of embodiment, the propeller blades 14 are here arranged as radial extensions of the disk-shaped rotor 5.

Also encompassed by the general inventive thinking are embodiments which provide some other constructional arrangement of the propeller blades 14, e.g. on the outer surface of a pan-shaped embodiment of the supporting structure 2.

The at least one radial bearing 3 only undertakes the radial mounting and accepts the radial forces, while an axial bearing mounting of the rotor 5 is effected by the two ring winding systems 8, preferably three-phase a.c. ring winding systems, in the stator 4 concerned. There is thus a magnetic axial bearing mounting. In this form of embodiment, the magnetic return path of the transverse flux motor is used for this regulated magnetic bearing. The two zero phase-sequence systems of the three-phase a.c. winding systems are regulated independently of each other in order, as appropriate, to hold or provide a bearing for the rotor 5, and hence ultimately the tail rotor 12, axially in its prescribed position.

The field lines 7, which are shown in principle, are excited by the zero phase-sequence system concerned.

By the weighting of the left and right zero phase-sequence current it is possible to control the attractive force in terms of its magnitude and sign—that is to the left or the right.

In a tail rotor 12, aerodynamic propeller forces arise mainly in an axial direction, and these are now absorbed by the magnetic axial bearing mounting.

The rotor 5 with its permanent magnets 15 arranged on a disk moves in air in the air gap between the two stators 4, and is air-cooled. In one form of embodiment, the eddy current losses of the permanent magnets 15 arranged on the rotor 5 are dissipated by external ventilation.

In a further particularly advantageous form of embodiment, the aerodynamics of the tail rotor 12 are designed such that air-cooling of the air gap 6 comes about due to the venturi effect. This means that it is not necessary to provide additional external fans, which on the one hand would need to be monitored for their functioning and on the other hand would unnecessarily increase the weight of the helicopter 10.

However, in order to reduce the eddy current losses, the permanent magnets 15 are made in laminated form.

Advantageously, the drive 1 and the tail rotor 12 will now have common radial and axial bearing mountings, and a gearbox and/or additional bearing units in the region of the tail rotor can be forgone.

In order to further reduce the weight of the helicopter, the stators 4 will advantageously be provided with metallic laminates.

In order to further increase the utilization of the drive 1 for the tail rotor 12, the ring windings 8 will have oil-cooling. In this case, a can 9 encloses a ring winding which runs concentrically, that is a phase of a stator 4 or the entire ring winding system of the stator 4 concerned. This is shown in principle in the lower half of FIG. 2 on the left-hand stator 4. By this means, the heat losses of the winding system are dissipated.

It is also possible for an entire stator 4 with its yoke, in particular iron core stack, and its winding system to be located in an oil bath.

The arrangement described for a drive 1 for a tail rotor 12 is thus constructed as a permanently excited transverse flux motor in a duplex arrangement, for a helicopter with a power of 234 kW at approx. 3600 l/min, with the drive 1 for the tail rotor 12 having an external diameter 16 of approx. 3500 mm, which corresponds to the internal diameter of the tail rotor 12.

The invention claimed is:

1. A tail rotor of a helicopter having an axis and comprising:
   a drive constructed in the form of a permanently excited transverse flux machine in a duplex arrangement and including two hollow stators which are spaced from one another in an axial direction to form a gap therebetween and each extending concentrically about the axis of the tail rotor and a single disk-shaped rotor which is arranged in the gap axially between the two stators and also extends concentrically about the axis of the tail rotor and is symmetrical relative to the axis, said disc-shaped rotor having radially extending permanent magnets arranged on its opposite axial sides facing said stators, each said stator having a ring winding system arranged concentrically about the axis of the tail rotor with a plurality of ring windings of each ring winding system arranged inside each said stator radially one above the other relative to the axis of the tail rotor and axially facing the radially extending permanent magnets of the rotor;
   propeller blades arranged on a radially outer perimeter of the disk-shaped rotor on diametrically opposite sides of the latter;
   a radial bearing assembly arranged radially inwardly of the disc-shaped rotor and radially inside said stators and supporting the disc-shaped rotor for rotation about the axis;
   cans provided in each of the stators and accommodating the ring winding systems the stators in one-to-one correspondence, wherein said cans are arranged on two opposite sides of said single disc-shaped rotor and are open axially towards each other and towards the permanent magnets and each of said cans in each of said stators has a plurality of partitions spaced from each other in the radial direction and forming a plurality of radially spaced recesses which are axially open towards the radially extending permanent magnets of opposite axial sides of the rotor and in which the ring winding of the ring winding systems are received and exposed towards the permanent magnets,
   wherein the cans accommodating the ring winding systems facing a central element of the disc-shaped rotor from its both axial sides, the partitions of the cans are located exactly opposite to one another on same radii, and recesses of the cans are located exactly opposite to one another on same radii; and
   a supporting element providing a secure enclosure of components including the stators, the permanent magnets, the central element of the rotor between the stators, and the air gap and having a dimension in a direction of the axis which is greater than a total dimension in the direction of the axis of all the components together,
   wherein the tail rotor is configured so that its aerodynamics are designed such that air cooling of the gap between the stators which is an air gap comes about due to a venturi effect.

2. The tail rotor of claim 1, wherein the permanent magnets are laminated.

3. The tail rotor of claim 1, wherein at least the ring winding systems are oil-cooled.

4. The tail rotor of claim 1, further comprising a common axial bearing assembly which jointly with the radial bearing assembly provides support for the drive and the tail rotor, wherein the axial bearing assembly of the tail rotor is a regulated magnetic axial bearing mounting which is realized by the ring winding systems of the stators with a zero phase-sequence system of a three-phase a.c. system of the ring winding systems of the stators.

* * * * *